United States Patent [19]

Kubota et al.

[11] Patent Number: 5,340,672
[45] Date of Patent: Aug. 23, 1994

[54] SECONDARY BATTERY

[75] Inventors: Tadahiko Kubota; Shoichiro Yasunami; Yukio Maekawa, all of Kanagawa, Japan

[73] Assignee: Fuji Photo Film Co., Ltd., Kanagawa, Japan

[21] Appl. No.: 85,173

[22] Filed: Jul. 2, 1993

[30] Foreign Application Priority Data

Jul. 6, 1992 [DE] Fed. Rep. of Germany ....... 4178488

[51] Int. Cl.$^5$ ............................................. H01M 10/00
[52] U.S. Cl. ................................... 429/249; 429/188; 429/192; 429/255; 252/62.2
[58] Field of Search ............... 429/188, 192, 249, 255; 526/256, 258; 252/62.2

[56] References Cited

U.S. PATENT DOCUMENTS

| | | | |
|---|---|---|---|
| 4,234,623 | 11/1980 | Moshtev et al. | |
| 4,530,890 | 7/1985 | Rampel | 429/222 |
| 4,840,856 | 6/1989 | Nakacho et al. | 429/192 |
| 4,822,701 | 4/1989 | Ballard et al. | |
| 5,115,057 | 5/1992 | Ono et al. | 526/256 |
| 5,204,196 | 4/1993 | Yokomichi et al. | 429/192 |
| 5,237,031 | 8/1993 | Kubota et al. | 429/192 X |

*Primary Examiner*—Stephen Kalafut
*Assistant Examiner*—M. Nuzzolillo
*Attorney, Agent, or Firm*—Sughrue, Mion, Zinn, Macpeak & Seas

[57] ABSTRACT

A secondary battery containing at least a negative electrode, a positive electrode, an electrolyte comprising an alkaline metal salt dissolved therein, and a separator in which the said separator includes a high molecular solid electrolyte membrane formed by coating a latex on a porous membrane, and then drying the material. The separator may include a high molecular solid electrolyte membrane formed by coating a latex on both surfaces of a porous membrane, and then drying the material.

18 Claims, 1 Drawing Sheet

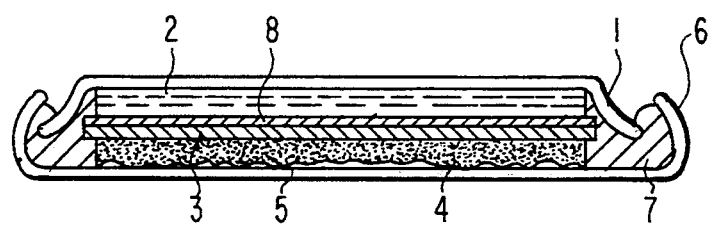

SECONDARY BATTERY

FIELD OF THE INVENTION

The present invention relates to a secondary battery having excellent charge and discharge characteristics. More particularly, the present invention relates to a lithium secondary battery having excellent charge and discharge characteristics.

BACKGROUND OF THE INVENTION

In order to apply a high molecular solid electrolyte to electrochemical devices such as a battery, the electrolyte needs to exhibit not only good ionic conductivity to reduce its resistance but also excellent film-forming properties and high film strength to prevent internal shortcircuiting. Further, the starting materials of the high molecular solid electrolyte need to be easily prepared. However, a high molecular solid electrolyte satisfying all of these requirements has never been developed.

For example, vinyl polymers having polyethylene oxide groups in side chains (hereinafter referred to as "PEO") as disclosed in D. J. Banister et al., "Polymer", 25, 1600, 1984, D. F. Shriver et al., "Journal of American Chemical Society", 106, 6854, 1984. Materials comprising low molecular PEO incorporated in polysiloxane are disclosed in Watanabe et al., "Journal of Power Sources", 20, 327, 1987. These high molecular solid electrolytes exhibit excellent film-forming properties and high strength. However, all these high molecular solid electrolytes also exhibit a low ionic conductivity and thus cannot be put into practical use.

In order to enhance the ionic conductivity of such materials at room temperature, a material comprising a liquid ionic conductor retained in a high molecular solid electrolyte has been studied. For example, JP-B-61-23947 (The term "JP-B" as used herein means an "examined Japanese patent publication") discloses a material comprising 90% by weight or more of an organic electrolyte having a relative dielectric constant of 10 or more incorporated in a high molecular solid electrolyte having a relative dielectric constant of 4 or more. However, the ionic conductivity of such a material is not sufficient. Further, JP-A-63-135477 (The term "JP-A" as used herein means an "unexamined published Japanese patent application") discloses a material comprising a low molecular PEO retained in a crosslinked high molecular matrix containing PEO group. Such a material also exhibits insufficient ionic conductivity.

Further examples of the enhancement of the ionic conductivity of such a material at room temperature are materials comprising a high molecular matrix having a polar group in side chains impregnated with an aprotic polar solvent such as propylene carbonate (hereinafter referred to as "PC") as disclosed in JP-B-57-9671, JP-A-63-239779 (U.S. Pat. No. 4,822,701), U.S. Pat. No. 4,830,939, and EP026084. However, these materials must retain a large amount of such a solvent to exhibit an enhanced ionic conductivity. Thus, these materials exhibit a remarkably poor film strength and hence cannot be put into practical use.

One known approach for the enhancement of film strength uses a material comprising a porous membrane such as nonwoven fabric impregnated with a high molecular solid electrolyte. For example, JP-A-60-195878 discloses a material comprising a PC solution of polyvinylidene fluoride coated on a nonwoven fabric. However, even such a material cannot attain a sufficient ionic conductivity. Further, JP-A-61-219469, JP-A-63-40270, and JP-A-63-102104 disclose similar approaches. However, none of these approaches can provide satisfactory ionic conductivity and film strength altogether.

Known methods for the preparation of these high molecular solid electrolytes include a method which comprises heating a monomer in the presence or absence of a solvent capable of dissolving the monomer therein (as disclosed in JP-A-62-50263, JP-A-1-241764), polymerization by ultraviolet rays (as disclosed in JP-A-63-135477), and polymerization by electron rays (as disclosed in JP-A-2-602). All these methods can provide an excellent ionic conductivity but a poor film strength.

Further, an approach which comprises spray-drying a latex of polyvinyl chloride, and then heat-melting the material to form a film which is then used as a separator is disclosed in Romanian Patent 96,422. This separator provides a sufficient film strength in an aqueous solution system battery but is disadvantageous in that it is subject to dissolution or swelling and provides high resistance in a nonaqueous electrolyte system.

As mentioned above, these high molecular solid electrolytes cannot provide a solution to all the foregoing problems such as remarkably low ionic conductivity at room temperature and poor film strength. It has thus been desired to provide a solid electrolyte providing a solution to all these problems.

SUMMARY OF THE INVENTION

It is therefore an object of the present invention to provide a secondary battery having excellent cycle properties and safety by using a mass-producible high molecular solid electrolyte membrane which exhibits a high ionic conductivity even at room temperature and excellent film-forming properties.

This and other objects of the present invention will become more apparent from the following detailed description and examples.

The objects of the present invention are accomplished with a secondary battery comprising at least a negative electrode, a positive electrode, an electrolyte comprising an alkaline metal salt dissolved therein, and a separator, wherein the said separator comprises a high molecular solid electrolyte membrane formed by coating a latex on a porous membrane, and then drying the latex material.

BRIEF DESCRIPTION OF THE DRAWING

By way of example and to make the description more clear, reference is made to the accompanying drawing in which:

The sole FIGURE is a sectional view of a coin-shaped battery used in examples, wherein the reference numeral 1 indicates a negative electrode sealing plate, the reference numeral 2 indicates a negative electrode compound pellet, the reference numeral 3 indicates a porous membrane, the reference numeral 4 indicates a positive electrode compound pellet, the reference numeral 5 indicates a collector, the reference numeral 6 indicates a positive electrode case, the reference numeral 7 indicates a gasket, and the reference numeral 8 indicates a high molecular solid electrolyte of the present invention.

DETAILED DESCRIPTION OF THE INVENTION

The present invention will be further described hereinafter.

The porous membrane can be either an organic high molecular membrane or inorganic membrane so long as it is electronically insulating and insoluble in an organic solvent, preferably an organic high molecular membrane. Preferred examples of such an organic high molecular membrane include a polyolefin membrane, a fluorine polymer membrane, a cellulose membrane, and a polyimide membrane. More preferred among these membranes is polyolefin membrane. Particularly preferred examples of a polyolefin membrane include a polyethylene membrane and polypropylene membrane. The maximum diameter of pores in the porous membrane is 0.01 μm or more, preferably 0.05 μm to 10 μm, more preferably 0.08 μm to 5 μm (visually measured by using an electron microscope). The porosity of the porous membrane is preferably 10% to 90%, more preferably 20% to 70%, particularly 40 to 70% (measured by ASTM D2873).

The surface of the porous membrane is preferably subjected to hydrophilic treatment. Examples of such a hydrophilic treatment include glow discharge treatment, corona discharge treatment, plasma treatment, and coating of a surface active agent. Preferred among these hydrophilic treatments are glow discharge treatment, corona discharge treatment, and plasma treatment.

Suitable latex to be coated on the porous membrane includes any compound which can be impregnated with an electrolyte after being coated and dried. Preferably, a compound containing a polar group may be used. A particularly preferred example of such a compound is represented by the following formula (1):

wherein A represents a repeating unit obtained by polymerizing a monomer having one polymerizable ethylenically unsaturated group and having nonpolar groups connected to side chain ester groups and amide groups or a monomer having one polymerizable ethylenically unsaturated group and having a nonpolar group in side chains; B represents a repeating unit obtained by polymerizing a monomer having one polymerizable ethylenically unsaturated group and having polar groups connected to side chain ester groups and amide groups or a monomer having one polymerizable ethylenically unsaturated group and having a cyano group; C represents a repeating unit obtained by polymerizing a monomer having at least two polymerizable ethylenically unsaturated groups, at least one of which being in side chains; D represents a repeating unit obtained by polymerizing a monomer having one polymerizable ethylenically unsaturated group and having crosslinkable groups in side chains; and a, b, c and d represent a percentage molar fraction of 0 to 95, 5 to 95, 1 to 20 and 1 to 80, respectively.

A, B, C and D in formula (1) will be further described hereinafter.

Preferred examples of the monomer represented by A include vinylbenzene compounds, (meth)acrylic compounds, and (meth)acrylamide compounds. More preferred among these monomers are (meth)acrylic compounds and (meth)acrylamide compounds. Particularly preferred is a compound represented by the following formula (2):

In formula (2), $R_1$ represents a hydrogen atom or a methyl group; $X_1$ represents a divalent connecting group, preferably a —C(O)O— or —C(O)NR$_3$— group, where $R_3$ represents a hydrogen atom or C$_{1-10}$ alkyl group, preferably a hydrogen atom or a C$_{1-5}$ alkyl group, particularly a hydrogen atom or a C$_{1-3}$ alkyl group. $R_2$ represents a hydrogen atom, alkyl group, alkenyl group, alkynyl group, aralkyl group or aryl group. The alkyl group represented by $R_2$ preferably has 1 to 20 carbon atoms, more preferably 1 to 15 carbon atoms, particularly 1 to 10 carbon atoms. The alkenyl group represented by $R_2$ preferably has 1 to 20 carbon atoms, more preferably 1 to 15 carbon atoms, particularly 1 to 10 carbon atoms. The alkynyl group represented by $R_2$ preferably has 1 to 20 carbon atoms, more preferably 1 to 15 carbon atoms, particularly 1 to 10 carbon atoms. The aralkyl group represented by $R_2$ preferably has 7 to 10 carbon atoms, more preferably 7 to 20 carbon atoms, particularly 7 to 15 carbon atoms. The aryl group represented by $R_2$ preferably has 6 to 30 carbon atoms, more preferably 6 to 20 carbon atoms, particularly 6 to 15 carbon atoms.

Preferred examples of the monomer represented by B include acrylonitrile, methacrylonitrile, and compounds represented by the following formula (3):

In formula (3), $R_4$ has the same meaning as $R_1$ in formula (2). $X_2$ has the same meaning as $X_1$ in formula (2). $R_5$ is —(CH(R$_6$)CH(R$_7$)O)$_m$—R$_6$ or —X$_3$—R$_9$. $R_6$, $R_7$ and $R_8$ each is a hydrogen atom or C$_{1-5}$ alkyl group, preferably a hydrogen atom or C$_{1-3}$ alkyl group, particularly a hydrogen atom or methyl group. The suffix m is an integer of 1 to 50, preferably 1 to 30, particularly 1 to 23. $X_3$ is a C$_{1-10}$ alkylene group, preferably a C$_{1-5}$ alkylene group, particularly a C$_{1-3}$ alkylene group. $R_9$ represents a polar group other than a chain ether, preferably a cyclic ether group or a carbonic ester group, more preferably a 3- to 12-membered cyclic ether group, 5- to 7-membered cyclic carbonic ester group or C$_{2-7}$ (including carbon atoms contained in the carbonyl group) noncyclic carbonic ester group, particularly a 3- to 8-membered cyclic ether group, 5- or 6-membered cyclic carbonic ester group or C$_{2-5}$ (including carbon atoms contained in the carbonyl group) noncyclic carbonic ester group. Particularly preferred examples of a polar group for $R_9$ include the groups given below:

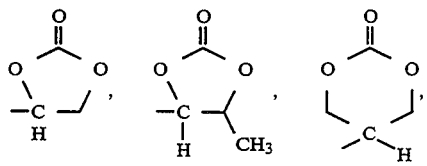

-continued

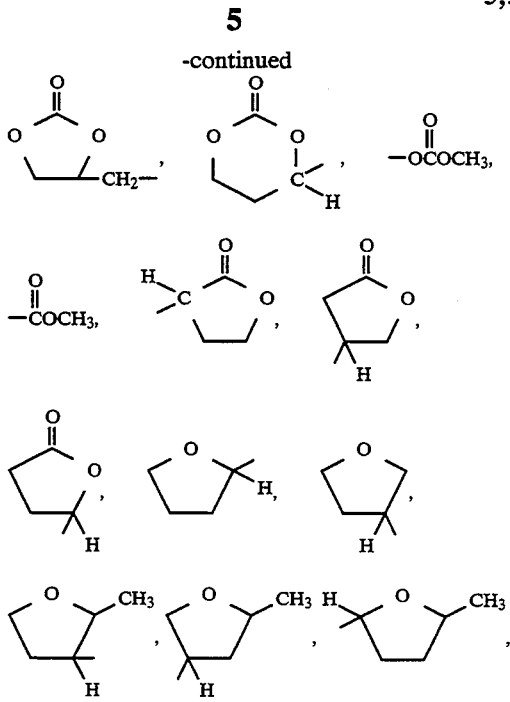

A preferred example of the monomer represented by C is a compound represented by the following formula (4) or (5):

$$CH_2=C(R_{10})C(O)-X_4-(O)C(R_{11})C=CH_2 \quad (4)$$

In formula (4), $R_{10}$ and $R_{11}$ each has the same meaning as $R_1$ in formula (2). $X_4$ is $-NH-X_5-NH-$ or $-O-X_5-O-$. $X_5$ is an alkylene group or $-(CH(R_{12})CH(R_{13}))_n-$ group. $R_{12}$ and $R_{13}$ each has the same meaning as $R_6$ in formula (3). The suffix n is an integer of 1 to 20, preferably 1 to 10, particularly 1 to 5. The alkylene group represented by $X_5$ is preferably a $C_{1-10}$ alkylene group, more preferably a $C_{1-5}$ alkylene group, particularly a $C_{1-3}$ alkylene group. Preferred examples of the $-(CH(R_{12})CH(R_{13}))_n-$ group represented by $X_5$ include $-(CH_2CH_2O)-$, $-(CH_2CH_2O)_2-$, $-(CH_2CH_2O)_4-$, and $-(CH_2CH_2O)_9-$.

$$(CH_2=C(R_{14})C(O)-O-CH_2)_3C-R_{15} \quad (5)$$

In formula (5), $R_{15}$ represents a $C_{1-10}$ alkyl group, preferably a $C_{1-5}$ alkyl group, particularly a $C_{1-3}$ alkyl group.

Suitable monomers represented by D include any compound which crosslinks latex grains when the latex is dried. The monomer represented by D is preferably a compound containing an epoxide group, an amino group, a carboxyl group, an acid anhydride, a hydroxyl group, an amide group, an N-methylolamide group, an eter of N-methylolamide or isocyanate. Preferred examples of such a compound include glycidyl acrylate, glycydyl methacrylate, allyl glycydyl ether, dimethylaminoethyl methacrylate, vinylpyridine, t-butylaminoethyl methacrylate, acrylic acid, methacrylic acid, crotonic acid, iraconic acid, itaconic monoester, maleic acid, maleic monoester, itaconic anhydride, maleic anhydride, allyl alcohol, 2-hydroxyethyl acrylate, 2-hydroxyethyl methacrylate, 2-hydroxypropyl acrylate, 2-hydroxypropyl methacrylate, acrylamide, methacrylamide, maleinamide, N-methylolacrylamide, N-methylolacrylamidemethylester, N-methylolacrylamideethylester, N-methylolacrylamidepropylester, N-methylolacrylamide-n-butylester, N-methylolacrylamide-sec-butylester, and N-methylolacrylamide-t-butylester. Particularly preferred among these compounds are glycidyl acrylate, glycidyl methacrylate, acrylic acid, methacrylic acid, 2-hydroxyethyl acrylate, 2-hydroxyl methacrylate, N-methylolacrylamide, N-methylolacrylamidemethylester, N-methylolacrylamideethylester, N-methylolacrylamidepropylester, and N-methylolacrylamide-n-butylester. These compounds may be used singly or in combination.

Specific examples of monomers from which A, B, C and D are derived will be given below, but the present invention should not be construed as being limited thereto.

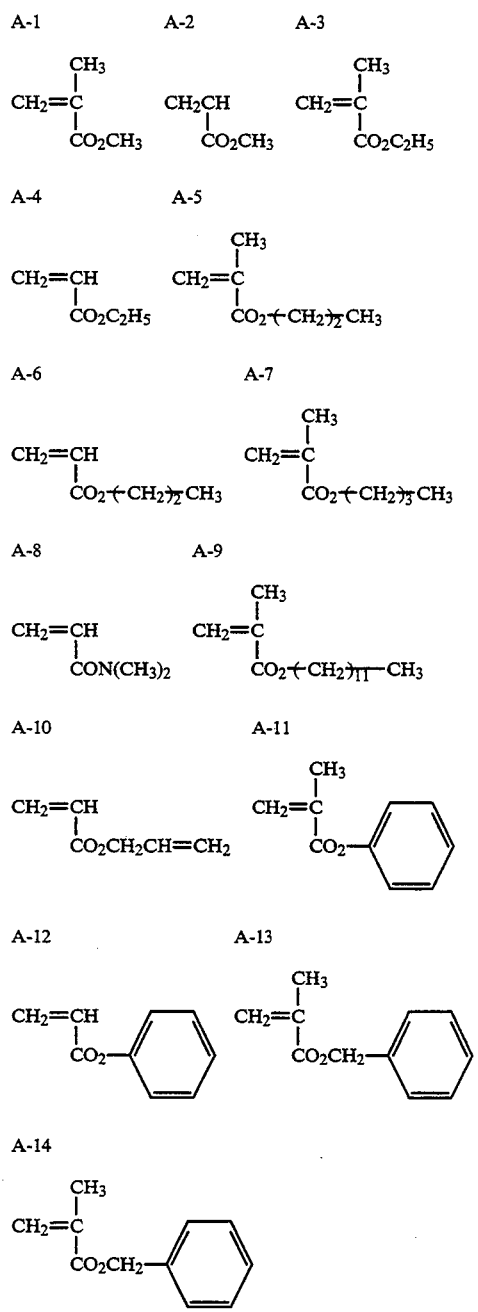

-continued
A-15
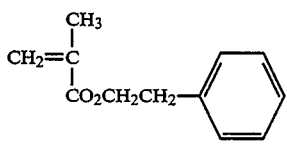
A-16
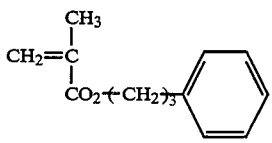
B-1     B-2
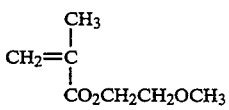 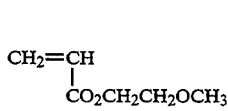
B-3
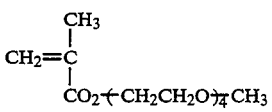
B-4
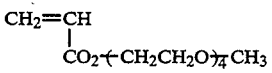
B-5
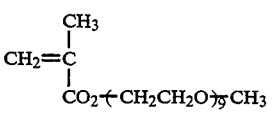
B-6
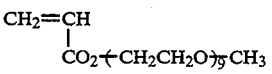
B-7
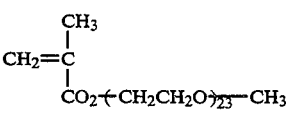
B-8     B-9
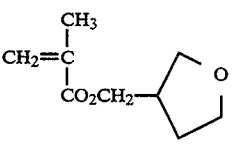 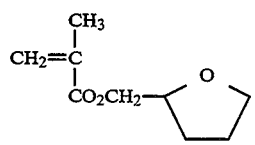
B-10     B-11
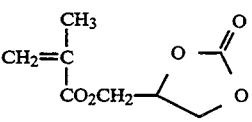 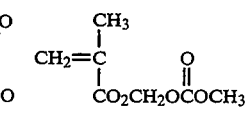
-continued
B-12
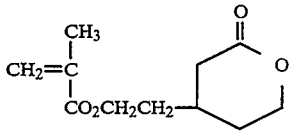
B-13
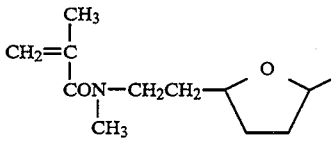
B-14
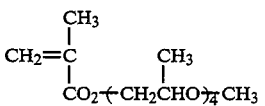
B-15     B-16
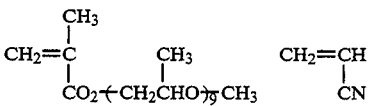
B-17     C-1
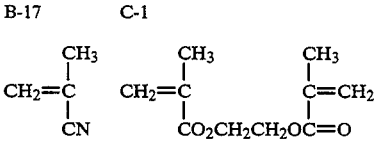
C-2
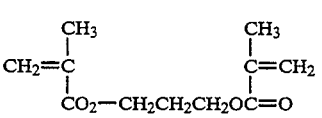
C-3
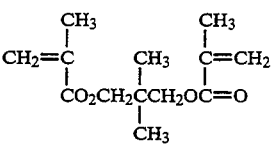
C-4
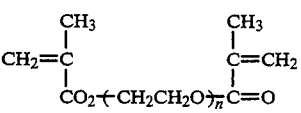
n = 2
C-5     C-6
C-4 wherein n = 4    C-4 wherein n = 9
C-7     C-8
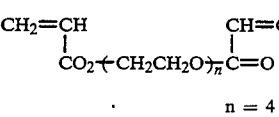   C-7 wherein n = 9
n = 4

-continued

C-9
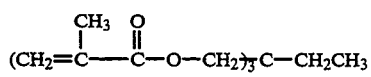

C-10
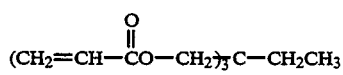

D-1  D-2
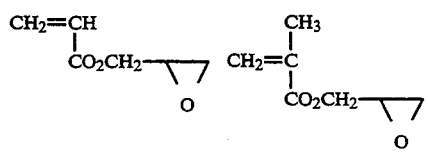

D-3  D-4
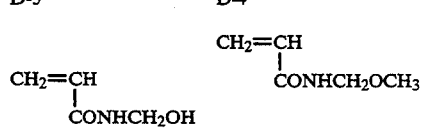

D-5

D-6  D-7  D-8
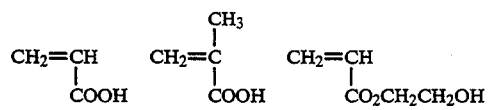

D-9  D-10
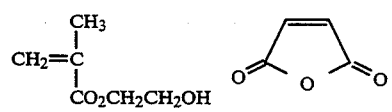

D-11  D-12
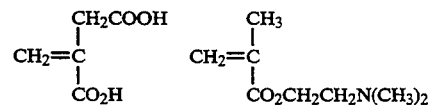

The polymerization of the foregoing compounds can be carried out by emulsion polymerization or dispersion polymerization.

For details of these polymerization methods, reference can be made to Kobunshi Kagaku Jikkenho (Experiments on High Molecular Compounds), pp. 1–50, Tokyo Kagaku Dojinsha, 1981, Kobunshi Kagaku Joron (Introduction of High Molecular Chemistry), 2nd ed., pp. 218–243, Kagaku Dojinsha, 1982, and K. J. Barret et al., Dispersion in Organic Media, John Wiley & Sons, 1975.

Particularly preferred among these polymerization methods is emulsion polymerization. The foregoing emulsion polymerization may be normally effected in an aqueous solvent in the presence of a emulsifying agent selected from the group consisting of anionic surface active agent (e.g., sodium dodecylsulfate, sodium dodecyl-di-phenylether-di-sulfate), cationic surface active agent (e.g., octadecyltrimethylammonium chloride), nonionic surface active agent (e.g., Emulex NP-20 available from Nihon Emulsion), gelatin and polyvinyl alcohol and a radical polymerization initiator (e.g., potassium persulfate, a mixture of potassium persulfate and sodium sulfite, V-50 available from Wako Junyaku K. K.) at a temperature of 40° C. to 100° C., preferably 50° C. to 80° C.

The polymerization of the compound of the present invention is preferably effected with the addition of a rubber latex. Suitable rubber latexes to be added include natural or synthetic rubber latex. Examples of such a rubber latex which can be used include styrene-butadiene latex and acrylonitrile-butadiene latex (e.g., Nipol LX-206, 209 (Nihon Zeon), JSR0561, 2108 (Nihon Gosei Gomu)).

Preferred examples of high molecular compounds which can be used in the present invention will be given below, but the present invention should not be construed as being limited thereto.

In the following formulae, the figures indicates the percentage molar fraction.

P-1:
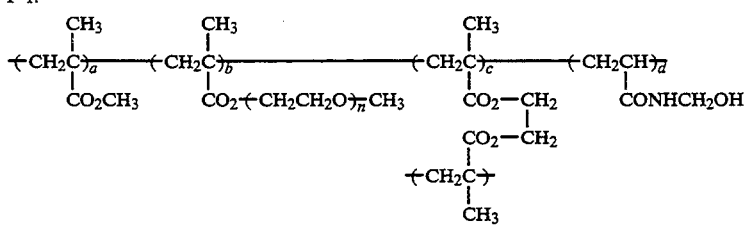

n = 9, a/b/c/d = 76/11/7/6 n=9, a/b/c/d=76/11/7/6
Latex having an average grain diameter of 120 nm

P-2:
P-1 wherein n=9, a/b/c/d=66/21/7/6
Latex having an average grain diameter of 108 nm P-3:
P-1 wherein n=4, a/b/c/d=66/21/7/6
Latex having an average grain diameter of 110 nm P-4:
P-1 wherein n=4, a/b/c/d=57/30/7/6
Latex having an average grain diameter of 101 nm

P-5:

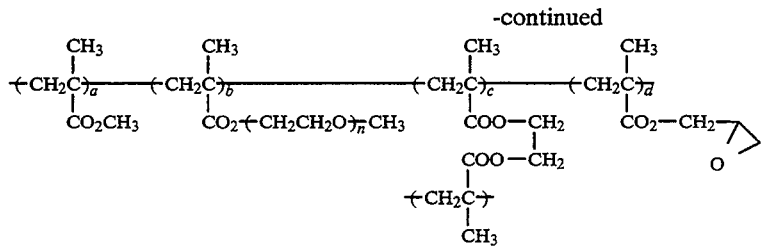

n = 4, a/b/c/d = 70/20/4/6 n=4, a/b/c/d=70/20/4/6
Latex having an average grain diameter of 99 nm
P-6:
P-5 wherein n=9, a/b/c/d=75/15/4/6
Latex having an average grain diameter of 110 nm
P-7:
P-5 wherein n=9, a/b/c/d=66/21/7/6
Latex having an average grain diameter of 115 nm P-10:
P-8 wherein n=4, a/b/c/d=80/10/4/6
Latex having an average grain diameter of 97 nm
P-11:
P-8 wherein n=4, a/b/c/d=55/30/4/11
Latex having an average grain diameter of 107 nm
P-12:
P-8 wherein n=9, a/b/c/d=65/25/5/5

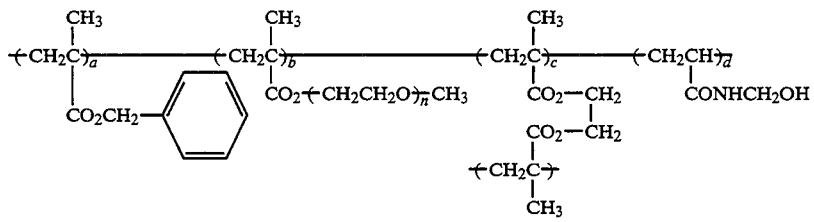

n = 4, a/b/c/d = 64/26/4/6 n=4, a/b/c/d=64/26/4/6
Latex having an average grain diameter of 113 nm
P-9:
P-8 wherein n=4, a/b/c/d=60/20/4/16

Latex having an average grain diameter of 121 nm
P-13:
P-8 wherein n=9, a/b/c/d=55/35/5/5
Latex having an average grain diameter of 107 nm

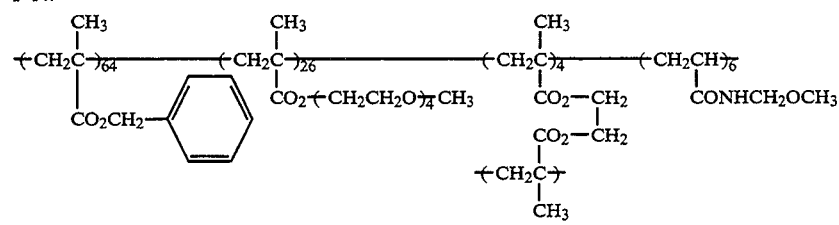

Latex having an average grain diameter of 101 nm

Latex having an average grain diameter of 105 nm

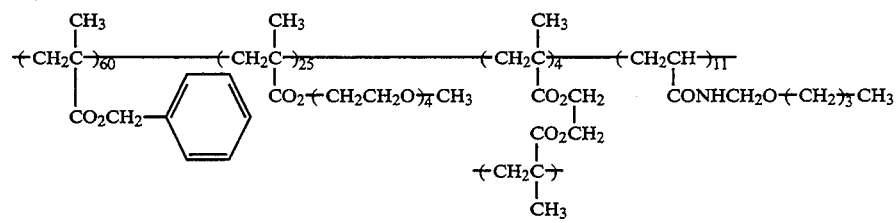

Latex having an average grain diameter of 111 nm

P-16:

-continued

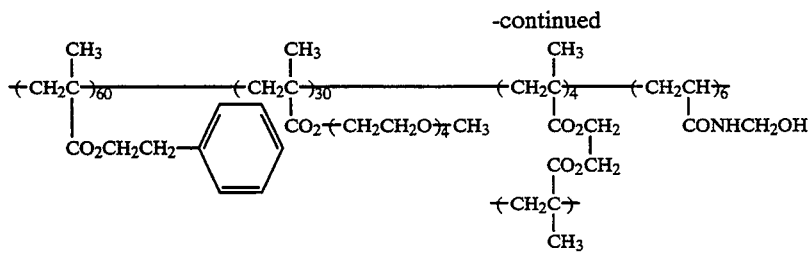

Latex having an average grain diameter of 123 nm

P-17:

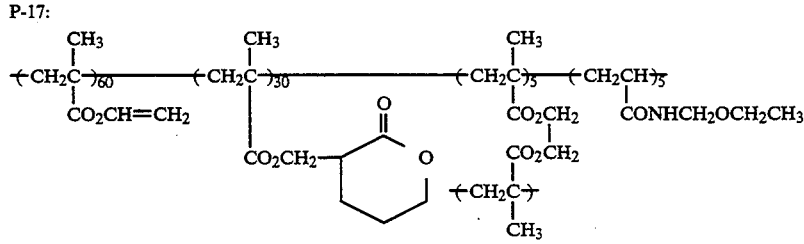

Latex having an average grain diameter of 116 nm

P-18:

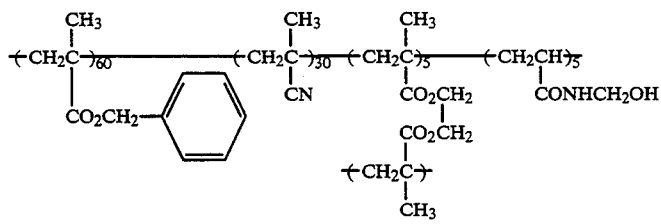

Latex having an average grain diameter of 101 nm

P-19:

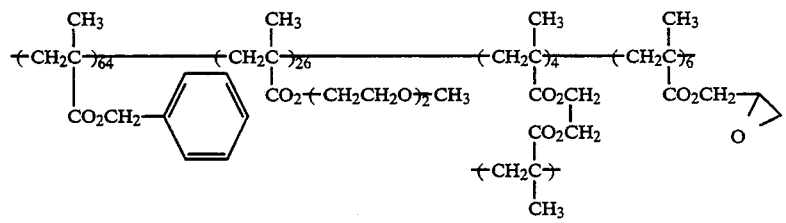

Latex having an average grain diameter of 91 nm

P-20:

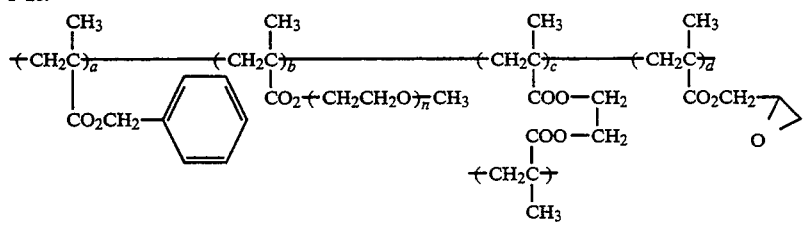

$n = 4$, a/b/c/d = 64/26/4/6

$n=4$, a/b/c/d=64/26/4/6
Latex having an average grain diameter of 119 nm

P-21

P-20 wherein $n=9$, a/b/c/d=64/26/4/6
Latex having an average grain diameter of 109 nm

P-22

P-20 wherein $n=4$, a/b/c/d=60/26/4/10
Latex having an average grain diameter of 110 nm

P-23

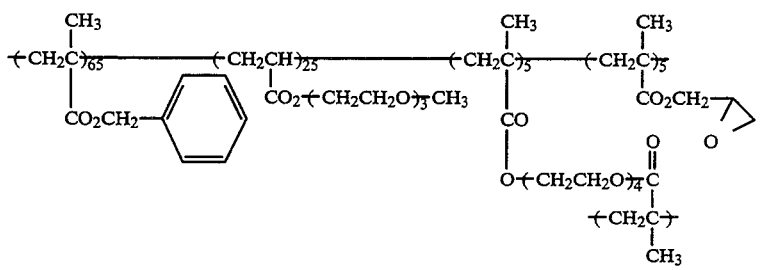

Latex having an average grain diameter of 130 nm

P-24

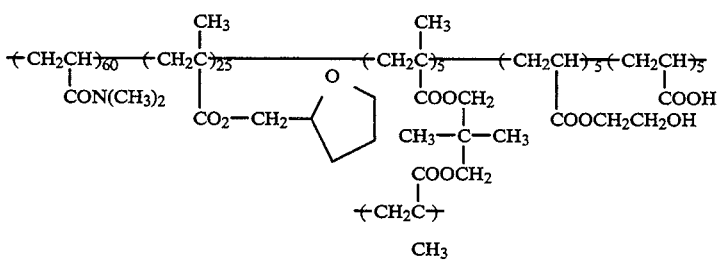

Latex having an average grain diameter of 140 nm

P-25

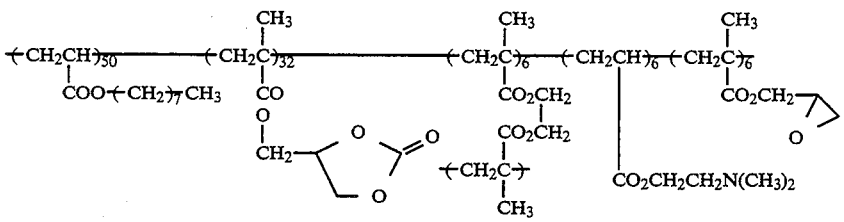

Latex having an average grain diameter of 110 nm

P-26

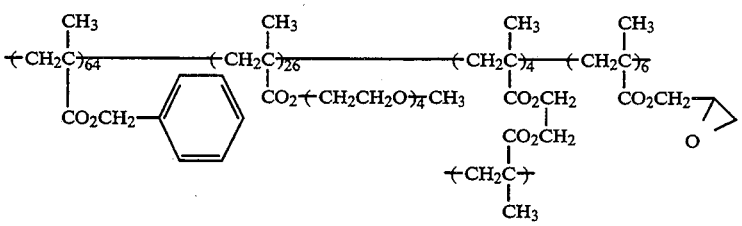

1.9 wt % of LX-206 added
Latex having an average grain diameter of 154 nm
P-27:
  P-26 wherein 5 wt % of LX-206 is added
Latex having an average grain diameter of 140 nm
P-28:
  P-26 wherein 5 wt % of JRR0561 (available from Nihon Gosei Gomu) is added
Latex having an average grain diameter of 129 μm The compound of formula (1) thus polymerized may then be coated on the porous membrane as described above. The coating of the compound of formula (1) can be carried out by any known coating method such as dip coating method, roller coating method, curtain coating method and extrusion coating method.

The compound of formula (1) may be coated on both sides of the porous membrane.

After coating, the compound of formula (1) may be dried to form a film. The drying may preferably be effected at a temperature at which the pores in the porous membrane are not clogged. In the case of polypropylene membrane, the drying is preferably effected at a temperature of 50° C. to 120° C., more preferably 60° C. to 100° C.

The drying time is preferably from 1 to 240 hours, more preferably 1 to 100 hours, particularly 5 to 50 hours.

The dried thickness of the polymer on one side is preferably from 1 to 100 μm, more preferably 1 to 50 μm, particularly 1 to 25 μm.

The film thus formed is preferably washed to remove the surface active agent and polymerization initiator. The washing solvent may be water or an organic solvent such as methanol, ethanol, acetone and propylene carbonate.

The positive electrode active material for a battery comprising the membrane of the present invention may be either an organic compound or "an inorganic compound. Suitable inorganic compounds include a transition metal chalcogenide or Li compound thereof. Specific preferred examples of such a transition metal chalcogenide include Li compounds of $MnO_2$, $Mn_2O_4$, $Mn_2O_3$, $CoO_2$, $Co_xMn_{1-x}O_y$, $Ni_xCo_{1-x}O_y$, $V_xMn_{1-x}O_y$, $Fe_xMn_{1-x}O_y$, $V_2O_5$, $V_3O_8$, $V_6O_{13}$, $Co_xV_{1-x}O_y$, $MoS_2$, $MoC_3$ and $TiS_2$. Particularly preferred among these Li compounds of transition metal chalcogenide are $LiCoO_2$ and $Li_aCo_bV_cO_d$ (a=0 to 1.1, b=0.12 to 0.9, c=1−b, d=2 to 2.5). These Li compounds of transition metal chalcogenide can mainly be obtained by a method of calcining a mixture of these transition metal chalcogenides with a compound containing lithium, or an ion exchanging method. The synthesis of such a transition metal chalcogenide may be effected by a well known method. In particular, it is preferably effected by calcining the material in the air or an inert gas such as argon and nitrogen at a temperature of 200° C. to 1,500° C.

Organic active materials that may be used include an anion dorpant type or cation dorpant type compound.

The cation dorpant type positive electrode active material can be selected from the group consisting of polyacene derivatives, hydroquinone derivatives, and disulfide compounds.

The anion dorpant type positive electrode active material can be selected from the group consisting of polyaniline derivatives, polypyrrole derivatives, and polythiophene derivatives. These derivatives may be copolymers.

These inorganic or organic positive electrode active materials may comprise a binder, reinforcement, an electrically conducting agent, etc. incorporated therein to be used as positive electrode additives. A suitable binder may be a natural polysaccharide, synthetic polysaccharide, synthetic polyhydroxy compound, synthetic polyacrylic compound, fluorine-containing compound or synthetic rubber. Preferred among these binders are starch, carboxymethylcellulose, diacetyl cellulose, hydroxypropyl cellulose, ethylene glycol, polyacrylic acid, polytetrafluoroethylene, polyvinylidene fluoride, ethylene-propylene-diene copolymer, and acrylonitrile-butadiene copolymer.

As a reinforcement material, a fibrous material which does not undergo reaction with lithium may be used. Examples include synthetic fibers such as polypropylene fiber, polyethylene fiber and Teflon fiber or carbon fibers.

Suitable electrically conducting agents include any compound which can enhance the electrical conductivity of the electrode additive. Examples of such a compound include acetylene black, ketchen black, natural graphite, silver, and polyphenylene derivative. The amount of such a compound to be added is preferably 15% or less, more preferably 1% or less.

The electrolyte consists of at least one aprotic organic solvent such as propylene carbonate, ethylene carbonate, diethyl carbonate, λ-butyrolactone, 1,2-dimethoxyethane, tetrahydrofuran, 2-methyltetrahydrofuran, dimethylsulfoxide, 1,3-dioxorane, formamide, dimethylformamide, dioxorane, acetonitrile, nitromethane, ethyl monoglyme, triester phosphate (as described in JP-A-60-23973), trimethoxymethane (as described in JP-A-61-4170), dioxorane derivatives (as described in JP-A-62-15771, JP-A-62-22372, and JP-A-62-108474), sulforane (as described in JP-A-62-31959), 3-methyl-2-oxazolidione (as described in JP-A-62-44961), propylene carbonate derivative (as described in JP-A-62-290069 and JP-A-62-290071), tetrahydrofuran derivative (as described in JP-A-63-32872), ethyl ether (as described in JP-A-63-62166) and 1,3-propane sultone (as described in JP-A-63-102173), a lithium salt soluble in such a solvent, such as $LiClO_4$, $LiBF_4$, $LiPF_6$, $LiCF_3SO_3$, $LiCG_3CO_3$, $LiAsF_6$, $LiSbF_6$, $Li(CF_3SO_2)_2N$, $LiB_{10}Cl_{10}$ (as described in JP-A-57-74974), Li(1,2-dimethoxyethane)$_2$-$ClO_4$ (as described in JP-A-57-74977), lower aliphatic carboxylate of lithium (as described in JP-A-60-41773), $LiAlCl_4$, LiCl, LiBr, LiI (as described in JP-A-60-247265), lithium chloroborane compound (as described in JP-A-61-165957) and lithium tetraphenylborate (as described in JP-A-61-214376). These elements may be used in combination. Typical among these combinations is an electrolyte comprising $LiClO_4$ or $LiBF_4$ incorporated in a mixture of propylene carbonate and 1,2-dimethoxyethane.

As the negative electrode active material, an alkaline metal, alkaline metal alloy, carbon material, transition metal chalcogenide or the like can be used. Specific examples of such an alkaline metal and alkaline metal alloy include metallic lithium, Li-Al alloy, Li-Mg alloy, Li-Hg alloy, Li-Pt alloy, Li-Sn-Ni alloy, Wood's metal, Li-Ga-In alloy, Li-Zn alloy, Li-Al-Ni alloy, Li-Al-Ag alloy, and Li-Al-Mn alloy. In particular, the use of metallic lithium or Li-Al alloy is useful.

As the carbon material, graphite, carbon black, coke, glassy carbon, carbon fiber or calcined product thereof can be used effectively. The calcining temperature is preferably 400° C. to 3,500° C., more preferably 700° C. to 3,500° C., particularly 1,000° C. to 3,500° C.

As the inorganic oxide and inorganic sulfide, any transition metal chalcogenide which can intercalate and deintercalate lithium can be used. Specific preferred examples of such a transition metal chalcogenide include oxide or sulfide of one or two or more of titanium, vanadium, manganese, iron, cobalt, nickel, zirconium, niobium, molybdenum and silver, and lithium compound thereof. More preferred among these compounds are $TiS_2$, $LiTiS_2$, $Fe_2O_3$, $Co_2O_3$, $Nb_2O_5$, $WO_2$, and $MoO_2$.

Carbon materials and transition metal chalcogenides, if used, may preferably comprise a binder and an electrically conducting agent incorporated therein as in the positive electrode. As such a binder and an electrically conducting agent, the same materials as used in the positive electrode can be used.

The carbon material and transition metal chalcogenide may be used in the form of a lamination with metallic lithium or its alloy.

It has been known to incorporate compounds in the electrolyte for the purpose of improving charge and discharge properties. Examples of such compounds include pyridine (as disclosed in JP-A-49-108525), triethyl phosphite (as disclosed in JP-A-47-4376), triethanolamine (as disclosed in JP-A-52-72425), cyclic ether (as disclosed in JP-A-57-152684), ethylenediamine (as disclosed in JP-A-58-87777), n-glyme (as disclosed in JP-A-58-87778), triamide hexaphosphate (as disclosed in JP-A-58-87779), nitrobenzene derivative (as disclosed in JP-A-58-214281), sulfur (as disclosed in JP-A-59-8280), quinoneimine dye ( as disclosed in JP-A-59-68184), N-substituted oxazolidinone and N,N'-substituted imidazolidione ( as disclosed in JP-A-59-

154778), ethylene glycol dialkylether (as disclosed in JP-A-59-205167), quaternary ammonium salt (as disclosed in JP-A-60-30065), polyethylene glycol (as disclosed in JP-A-60-41773), pyrrole (as disclosed in JP-A-60-79677), 2-methoxyethanol (as disclosed in JP-A-60-89075), $AlCl_3$ (as disclosed in JP-A-61-88466), monomer to be incorporated in the electrically conducting polymer electrode active material (as disclosed in JP-A-61-161673), triethylene phosphorylamide (as disclosed in JP-A-61-208758), trialkyl phosphine (as disclosed in JP-A-62-80976), morpholine (as disclosed in JP-A-62-80977), aryl compound containing carbonyl group (as disclosed in JP-A-62-86673), crown ethers such as 12-crown-4 (as disclosed in "Physical Review B", vol. 42, page 6424, 1990), hexamethylphosphoric triamide and 4-alkylmorpholine (as disclosed in JP-A-62-217575), bicyclic tertiary amine (as disclosed in JP-A-62-217578), oil (as disclosed in JP-A-62-287580), quaternary phosphonium salt (as disclosed in JP-A-63-121268), and tertiary sulfonium salt (as disclosed in JP-A-63-121269).

In order to render the electrolyte fire retardant, a halogen-containing solvent such as carbon tetrachloride and ethylene chloride trifluoride may be incorporated in the electrolyte (as disclosed in JP-A-48-36632). Further, in order to render the electrolyte capable of being stored at an elevated temperature, carbonic acid gas may be incorporated in the electrolyte (as disclosed in JP-A-59-134567).

Further, the positive electrode active material can comprise an electrolyte incorporated therein. For example, an ionically conductive polymer or nitromethane (as described in JP-A-48-36633) and the addition of an electrolyte (as described in JP-A-57-124870) have been disclosed.

The surface of the positive electrode active material may be modified. For example, the surface of a metal oxide may be treated with an esterifying agent (as described in JP-A-55-163779), a chelating agent (as described in JP-A-55-163780), an electrically conductive high molecular compound (as described in JP-A-58-163188, JP-A-59-14274), a polyethylene oxide (as described in JP-A-60-97561) or the like.

Similarly, the surface of the negative electrode active material may be modified. For example, an ionically conductive polymer or polyacetylene layer may be provided on the surface of the negative electrode active material (as described in JP-A-58-111276). Alternatively, the surface of the negative electrode active material may be treated with LiCl (as described in JP-A-58-142771) or ethylene carbonate (as described in JP-A-59-31573).

As the carrier for electrode active materials there may be used, for positive electrode, ordinary stainless steel, nickel and aluminum as well as porous foamed metal (as described in JP-A-59-18578), titanium (as described in JP-A-59-68169), expanded metal (as described in JP-A-61-264686), and punched metal or, for negative electrode, ordinary stainless steel, nickel, titanium and aluminum as well as porous nickel (as described in JP-A-58-18883), porous aluminum (as described in JP-A-58-38466), sintered aluminum (as described in JP-A-59-130074), formed body of aluminum fiber group (as described in JP-A-59-148277), surface-silvered stainless steel (as described in JP-A-60-41761), calcined carbon material such as calcined phenol resin (as described in JP-A-60-112264), Al-Cd alloy (as described in JP-A-60-211779), porous foamed metal (as described in JP-A-61-74268), etc.

As the collector, any electron conductor which undergoes no chemical change in the battery may be used. Examples of such an electron conductor include commonly used stainless steel, titanium or nickel as well as nickel-plated copper (as described in JP-A-48-36627), titanium-plated copper, copper-treated stainless steel (for positive electrode material) (as described in JP-A-60-175373).

The shape of the battery of the present invention may be coin, button, sheet, cylinder, or the like.

The present invention will be further described in the following examples, but the present invention should not be construed as being limited thereto. Amounts are by weight unless otherwise indicated.

EXAMPLE 1

Synthesis of latex (Synthesis of Compound P-1)

Into a 1-l three-necked flask equipped with an agitator and a condenser were charged 2.0 g of allyl-N-methyl sodium tauride, 0.8 g of N-methyolacrylamide and 480 ml of distilled water. The material was then heated at a temperature of 80° C. with stirring in a stream of nitrogen. To the solution was added 0.3 g of potassium persulfate. The solution was further stirred for 5 minutes. A monomer solution which had been separately prepared (30 g of methyl methacrylate, 24 g of PEO ester methacrylate (M-90G available from Shin-nakamura Kagaku K.K.), 6 g of ethylene glycol-di-methacrylate) was added dropwise to the solution in 1 hour. After the completion of the dropwise addition, 0.2 g of potassium persulfate was added to the solution which was then further allowed to undergo reaction for 3 hours. The reaction solution was then cooled to room temperature. The resulting latex solution was then filtered through a filter paper having a pore size of 10 μm to obtain 538 g of a latex solution of Compound P-1 (solid content yield: 92.5%).

Compounds P-2 to P-7 were similarly synthesized.

(Synthesis of Compound P-8)

Into the same apparatus as used in the synthesis of P-1 were charged 1.7 ml of a 40% aqueous solution of sodium dodecyl-di-phenylether-di-sulfate, 450 ml of distilled water, and 1.4 g of N-methylolacrylamide. The material was then heated to a temperature of 60° C. with stirring in a stream of nitrogen. To the solution were added 1.5 ml of a 2N aqueous ammonia and 3.8 ml of 0.01N ferrous sulfate. The solution was stirred for 10 minutes. A monomer solution which had been separately prepared (50 g of benzyl methacrylate, 24 g of PEO ester methacrylate (M-90G available from Shin-nakamura Kagaku K.K.), 1.4 g of ethylene glycol-di-methacrylate) was added to the solution. Subsequently, 0.2 g of potassium persulfate and 0.08 g of sodium hydrogensulfide were added to the solution which was then further allowed to undergo reaction for 2 hours. 0.2 g of potassium persulfate and 0.08 g of sodium hydrogensulfide were then added to the reaction solution which was then further allowed to undergo reaction for 3 hours. The reaction solution was then cooled to room temperature. The resulting latex solution was then filtered through a filter paper having a pore size of 10 μm to obtain 520 g of a latex solution of Compound P-8 (solid content yield: 91.5%).

Compounds P-9 to P-18 were similarly synthesized.

(Synthesis of Compound P-19)

Into the same apparatus as used in the synthesis of P-1 were charged 1.7 ml of a 40% aqueous solution of sodium dodecyl-di-phenylether-di-sulfate and 450 ml of distilled water. The material was then heated to a temperature of 60° C. with stirring in a stream of nitrogen. A monomer solution which had been separately prepared (50 g of benzyl methacrylate, 22 g of PEO ester methacrylate (M-20G available from Shinnakamura Kagaku K. K.), 3.5 g of ethylene glycol-di-methacrylate, 3.8 g of glycidyl methacrylate) was added to the solution. Subsequently, 0.2 g of potassium persulfate and 0.08 g of sodium hydrogensulfide were added to the solution which was then further allowed to undergo reaction for 2 hours. 0.2 g of potassium persulfate and 0.08 g of sodium hydrogensulfide were then added to the reaction solution which was then further allowed to undergo reaction for 3 hours. The reaction solution was then cooled to room temperature. The resulting latex solution was then filtered through a filter paper having a pore size of 10 $\mu$m to obtain 528 g of a latex solution of Compound P-19 (solid content yield: 94.5%).

Compounds P-20 to P-25 were similarly synthesized.
(Synthesis of Compound P-26)

Into the same apparatus as used in the synthesis of P-1 were charged 1.7 ml of a 40% aqueous solution of sodium dodecyl-di-phenylether-di-sulfate and 450 ml of distilled water. The material was then heated to a temperature of 60° C. with stirring in a stream of nitrogen. To the solution was added 10 ml of styrene-butadiene latex (Nipol LX-206 available from Nihon Zeon K.K.). A monomer solution which had been separately prepared (50 g of benzyl methacrylate, 30 g of PEO ester methacrylate (M-40G available from Shinnakamura Kagaku K.K.), 3.5 g of ethylene glycol-di-methacrylate, 3.8 g of glycidyl methacrylate) was added to the solution. Subsequently, 0.2 g of potassium persulfate and 0.08 g of sodium hydrogensulfide were added to the solution which was then further allowed to undergo reaction for 2 hours. 0.2 g of potassium persulfate and 0.08 g of sodium hydrogensulfide were then added to the reaction solution which was then further allowed to undergo reaction for 3 hours. The reaction solution was then cooled to room temperature. The resulting latex solution was then filtered through a filter paper having a pore size of 10 $\mu$m to obtain 542 g of a latex solution of Compound P-31 (solid content yield: 94%).

Compounds P-27 to P-40 were similarly synthesized.

EXAMPLE 2

Preparation of membrane of high molecular solid electrolyte

Preparation of high molecular solid electrolyte membrane M-1 from plasma-treated porous membrane The plasma irradiation was effected by means of Model BP-1 available from Samco International Kenkyusho K.K.

A 7 cm×7 cm porous polypropylene film (Julagard 2500 available from Dicel Kagaku K.K.) was placed on an electrode plate. The pressure of the system was then reduced to 0.675 Torr at an ordinary air flow rate of 30 ml/m. The porous polypropylene film was then irradiated with plasma at 50 W for 30 seconds. The system was returned to normal pressure. The polypropylene film was then withdrawn. The latex solution of P-1, which had been adjusted with acetic acid to pH 3, was then coated on the polypropylene film in an amount of 45 ml per m².

The coating film was then dried in a constant temperature bath at a temperature of 80° C. for 24 hours to obtain a high molecular solid electrolyte membrane M-1. The material was washed with water, and then dried. The membrane thickness including that of Julagard 2500 (25 $\mu$m) was 28 $\mu$m on the average.

High molecular solid electrolyte membranes M-2 to M-16 were similarly prepared. The latex used, drying time, drying temperature, and membrane thickness are set forth in Table 1.

Preparation of high molecular solid electrolyte membrane M-17 from plasma-treated porous membrane The latex solution of P-1, which had been adjusted with acetic acid to pH 3, was coated on one side of a membrane which had been irradiated with plasma on both sides thereof under the same conditions as used in M-1 in an amount of 45 ml per m². The coating film was then dried in a constant temperature bath at a temperature of 80° C. for 2 hours. The other side of the membrane was similarly coated. The coating film was then dried in a constant temperature bath at a temperature of 80° C. for 24 hours. The material was washed with water, and then dried. The membrane thickness including that of Julagard 2500 (25 $\mu$m) was 31 $\mu$m on the average.

The section of the membrane of the present invention was observed under an electron microscope. As a result, it was observed that the porous membrane had not been filled with the high molecular solid electrolyte at all, and a film had been formed on the surface of the porous membrane.

High molecular solid electrolyte membranes M-18 to M-33 were similarly prepared. The latex used, drying time, drying temperature, and membrane thickness are set forth in Table 1. None of these membranes were filled with an electrolyte in their porous membranes.

Preparation of high molecular solid electrolyte membrane M-34 from corona-discharged porous membrane A 30 cm×30 cm porous polypropylene film (Julagard 2500 available from Dicel Kagaku K.K.) was applied on a polyethylene terephthalate sheet. The material was then subjected to corona discharge treatment at an energy density of 1.8 J/cm² at a rate of 28 m/m.

The latex solution of P-2 was then coated in an amount of 40 ml per m² in the same manner as in the plasma treatment. The coating film was then dried in a constant temperature bath at a temperature of 80° C. for 24 hours to obtain a high molecular solid electrolyte membrane M-21. The membrane was washed water, and then dried. The membrane thickness including that of Julagard 2500 (25 $\mu$m) was 32 $\mu$m on the average. The section of the membrane of the present invention was observed under an electron microscope. As a result, it was observed that the porous membrane had not been filled with the high molecular solid electrolyte at all, and a film had been formed on the surface of the porous membrane.

High molecular solid electrolyte membranes M-35 to M-49 were similarly prepared. The latex used, drying time, drying temperature, and membrane thickness are set forth in Table 1. None of these membranes were filled with an electrolyte in their porous membranes.

Preparation of high molecular solid electrolyte membrane M-50 from corona-discharged porous membrane The latex solution of P-1, which had been adjusted with acetic acid to pH 3, was coated on one side of a membrane which had been corona-discharged on both sides thereof under the same conditions as used in M-34 in an amount of 45 ml per m². The coating film was then dried in a constant temperature bath at a temperature of 80° C. for 2 hours. The other side of the membrane was similarly coated. The coating film was then dried in a constant temperature bath at a temperature of 80° C. for 24 hours. The material was washed with water, and then dried. The membrane thickness including that of Julagard 2500 (25 μm) was 31 μm on the average.

The section of the membrane of the present invention was observed under an electron microscope. As a result, it was observed that the porous membrane had not been filled with the high molecular solid electrolyte at all, and a film had been formed on the surface of the porous membrane.

High molecular solid electrolyte membranes M-51 to M-65 were similarly prepared. The latex used, drying time, drying temperature, and membrane thickness are set forth in Table 1. None of these membranes were filled with an electrolyte in their porous membranes.

EXAMPLE 3

Preparation of battery

90% by weight of $V_6O_{13}$ as a positive electrode active material, 5% by weight of Teflon as a binder, and 5% by weight of carbon black as an electrically conducting agent were mixed. The mixture was then pressure-molded to prepare a pellet having a diameter of 1.6 cm. A negative electrode having a diameter of 1.6 cm was punched out of metallic lithium. These positive electrode and negative electrode, the separator (M-1) of the present invention, and a mixture of the same volume of propylene carbonate and dimethoxyethane ($LiBF_4$: 1 mol/l) as an electrolyte were used to prepare a battery as shown in the sole figure. The battery was then charged and discharged between 1.5 V and 3.5 V at a constant current of 2 mA for 100 cycles. The battery was again charged and then disassembled. The surface of the lithium negative electrode and the separator were observed under an electron microscope. No dendrite was observed formed on the surface of the lithium negative electrode. There was no break in the high molecular solid electrolyte membrane coated on the separator.

100 pieces of such a battery were prepared and subjected to a charge and discharge test under the same conditions as above. None of these specimens showed inner shortcircuiting.

After 200 cycles of charge and discharge, these specimens exhibited a capacity drop of 4%.

EXAMPLES 4 TO 48

Examples 4 to 48 were carried out in the same manner as in Example 3. The positive electrode active materials, negative electrode active materials, electrolytes and high molecular solid electrolyte membranes used, and the capacity drop after 200 cycles of charge and discharge are set forth in Table 2. These specimens showed no dendrite formation and no break in the high molecular solid electrolyte membrane. The percentage shortcircuiting of the 100 pieces of each specimen was 0%.

EXAMPLE 49

A battery was prepared in the same manner as in Example 3 except that a pellet (90 wt % of pitch coke and 10% of Teflon) made of a pitch coke calcined at a temperature of 1,300° C. instead of metallic lithium as a negative electrode and $LiCoO_2$ as a positive electrode active material were used. The battery thus obtained was then subjected to charge and discharge test in the same manner as in Example 3. After 200 cycles of charge and discharge, the capacity drop was 8%. 100 pieces of such a battery were prepared. These specimens were rapidly charged at a constant current of 10 mA. As a result, the percentage shortcircuiting was 0%.

EXAMPLES 50 TO 93

Examples 50 to 93 were carried out in the same manner as in Example 49. The positive electrode active materials, negative electrode active materials, electrolytes and high molecular solid electrolyte membranes used, and the capacity drop after 200 cycles of charge and discharge are set forth in Table 2. These specimens showed no break in the high molecular solid electrolyte membrane. The percentage shortcircuiting of the 100 pieces of each specimen was 0%.

COMPARATIVE EXAMPLE 1

A battery was prepared in the same manner as in Example 3 except that the separator of the present invention was replaced by a gelled methyl polymethacrylate (impregnated with 100 wt % of a mixture of the same volume of propylene carbonate and dimethoxyethane ($LiBF_4$ 1 mol/l)). The battery thus obtained was then subjected to a charge and discharge test in the same manner as in Example 3.

After the battery was then charged and discharged for 100 cycles, the battery was again charged and then disassembled. The surface of the lithium negative electrode and the separator were observed under an electron microscope. As a result, a large amount of dendritie was observed formed on the surface of the lithium negative electrode. Further, the gelled methyl polymethacrylate used as a separator was observed depressed, destroying the original shape of the membrane.

The percentage occurrence of internal shortcircuiting was 20%.

After 200 cycles of charge and discharge, the capacity drop was 44%.

COMPARATIVE EXAMPLE 2

A battery was prepared in the same manner as in Example 3 except that the separator of the present invention was replaced by a membrane obtained by polymerizing 75% by weight of methoxyethylene glycol monoacrylate (AM-90G available from Shinnakamura Kagaku K.K.) and 25% by weight of polyethylene glycol dimethacrylate (M-9G available from Shinnakamura Kagaku K.K.) (impregnated with 100% by weight of $LiBF_4$ (1 mol/l)) in the presence of 0.1% by weight of azobisisobutyronitrile at a temperature of 50° C. for 5 hours. The battery thus obtained was then subjected to charge and discharge test in the same manner as in Example 3.

After the battery was then charged and discharged for 100 cycles, the battery was again charged and then disassembled. The surface of the lithium negative electrode and the separator were observed under an electron microscope. As a result, a large amount of dendrites was observed formed on the surface of the lithium negative electrode. Further, the gelled methyl polymethacrylate used as a separator was observed partially depressed and protruding from the nonwoven fabric.

The percentage occurrence of internal shortcircuiting was 2%.

After 200 cycles of charge and discharge, the capacity drop was 24%.

COMPARATIVE EXAMPLE 3

A battery was prepared in the same manner as in Comparative Example 2 except that azobisisobutyronitrile was replaced by 0.5% by weight of 2,2-dimethoxy-2-phenylacetophenone and 400% by weight of a mixture of the same volume of propylene carbonate and dimethoxyethane (LiBF$_4$ 1 mol/l) was incorporated in the system. The solution was irradiated with ultraviolet rays from a 250 W high voltage mercury vapor lamp in a stream of nitrogen to form a cured membrane which was then incorporated in the battery. The battery thus obtained was then subjected to charge and discharge test in the same manner as in Example 3. After 200 cycles, the capacity drop was 28%.

After the battery was then charged and discharged for 100 cycles, the battery was again charged and then disassembled. The surface of the lithium negative electrode and the separator were observed under an electron microscope. As a result, a large amount of dendrites was observed formed on the surface of the lithium negative electrode. Further, the high molecular solid electrolyte membrane used as a separator was observed partially depressed.

The percentage occurrence of internal shortcircuiting was 4%.

COMPARATIVE EXAMPLE 4

A battery was prepared in the same manner as in Comparative Example 3 except that the separator used was a gelled high molecular solid electrolyte membrane obtained by irradiating a polypropylene nonwoven fabric (thickness: 100 μm) impregnated with the same monomer solution as used in Comparative Example 3 with ultraviolet rays from a 250 W high voltage mercury vapor lamp. The battery thus obtained was then subjected to charge and discharge test in the same manner as in Example 3. After 200 cycles, the capacity drop was 36%.

After the battery was then charged and discharged for 100 cycles, the battery was again charged and then disassembled. The surface of the lithium negative electrode and the separator were observed under an electron microscope. As a result, a large amount of dendrites was observed formed on the surface of the lithium negative electrode. Further, the high molecular solid electrolyte membrane used as a separator was observed partially depressed and protruding from the nonwoven fabric.

The percentage occurrence of internal shortcircuiting was 2%.

COMPARATIVE EXAMPLE 5

A battery was prepared in the same manner as in Comparative Example 4 except that the separator used was a gelled high molecular solid electrolyte membrane obtained by irradiating a polypropylene nonwoven fabric (thickness: 100 μm) impregnated with the same monomer solution as used in Comparative Example 4 with 20 Mrad electron rays. The battery thus obtained was then subjected to charge and discharge test in the same manner as in Example 3. After 200 cycles, the capacity drop was 32%.

After the battery was then charged and discharged for 100 cycles, the battery was again charged and then disassembled. The surface of the lithium negative electrode and the separator were observed under an electron microscope. As a result, a large amount of dendrites was observed formed on the surface of the lithium negative electrode. Further, the high molecular solid electrolyte membrane used as a separator was observed partially depressed and protruding from the nonwoven fabric.

The percentage occurrence of internal shortcircuiting was 2%.

COMPARATIVE EXAMPLE 6

A battery was prepared in the same manner as in Example 3 except that the separator of the present invention was replaced by Julagard 2500 whose pores had been filled with a solution of 12% by weight of lithium perchlorate in polyethylene oxide dimethyl ether having an average molecular weight of 240. The battery thus obtained was then subjected to charge and discharge test in the same manner as in Example 3. After 200 cycles, the capacity drop was 37%.

After the battery was then charged and discharged for 100 cycles, the battery was again charged and then disassembled. The surface of the lithium negative electrode and the separator were observed under an electron microscope. As a result, a large amount of dendrites was observed formed on the surface of the lithium negative electrode. Further, the separator had polyethylene oxide dimethyl ether remained by only 45% by weight of that used.

The percentage occurrence of internal shortcircuiting was 4%.

COMPARATIVE EXAMPLE 7

A battery was prepared in the same manner as in Example 49 except that the separator used was Julagard 2500 alone. The battery thus obtained was then subjected to charge and discharge test in the same manner as in Example 49. After 200 cycles, the capacity drop was 18%. The percentage occurrence of internal shortcircuiting was 5%.

TABLE 1

| Membrane No. | Latex | Drying time (h) | Drying temperature (°C.) | Membrane thickness (μm) |
|---|---|---|---|---|
| M-1 | P-1 | 24 | 80 | 28 |
| M-2 | P-1 | 48 | 80 | 28 |
| M-3 | P-1 | 24 | 100 | 29 |
| M-4 | P-5 | 24 | 80 | 28 |
| M-5 | P-7 | 30 | 80 | 27 |
| M-6 | P-8 | 24 | 80 | 28 |
| M-7 | P-8 | 24 | 100 | 28 |
| M-8 | P-14 | 24 | 80 | 28 |
| M-9 | P-15 | 24 | 80 | 27 |
| M-10 | P-15 | 120 | 80 | 27 |
| M-11 | P-20 | 24 | 80 | 27 |
| M-12 | P-20 | 24 | 100 | 28 |
| M-13 | P-20 | 40 | 80 | 28 |
| M-14 | P-26 | 24 | 80 | 29 |
| M-15 | P-26 | 40 | 80 | 29 |
| M-16 | P-27 | 24 | 100 | 32 |
| M-17 | P-1 | 24 | 80 | 32 |
| M-18 | P-5 | 24 | 80 | 33 |
| M-19 | P-7 | 24 | 80 | 33 |
| M-20 | P-8 | 24 | 80 | 32 |
| M-21 | P-8 | 40 | 80 | 33 |
| M-22 | P-8 | 24 | 100 | 32 |
| M-23 | P-8 | 24 | 80 | 35 |
| M-24 | P-11 | 24 | 80 | 32 |
| M-25 | P-15 | 120 | 80 | 32 |
| M-26 | P-16 | 24 | 80 | 33 |
| M-27 | P-19 | 24 | 80 | 33 |
| M-28 | — | — | — | — |
| M-29 | P-20 | 24 | 80 | 35 |
| M-30 | P-20 | 24 | 100 | 33 |
| M-31 | P-26 | 24 | 80 | 36 |

TABLE 1-continued

| Membrane No. | Latex | Drying time (h) | Drying temperature (°C.) | Membrane thickness (μm) |
|---|---|---|---|---|
| M-32 | P-26 | 24 | 100 | 32 |
| M-33 | P-27 | 24 | 80 | 34 |
| M-34 | P-2 | 24 | 80 | 32 |
| M-35 | P-4 | 24 | 80 | 28 |
| M-36 | P-5 | 24 | 80 | 29 |
| M-37 | P-7 | 24 | 80 | 28 |
| M-38 | P-8 | 24 | 80 | 29 |
| M-39 | P-8 | 40 | 80 | 28 |
| M-40 | P-11 | 40 | 80 | 28 |
| M-41 | P-15 | 120 | 80 | 28 |
| M-42 | P-18 | 40 | 80 | 27 |
| M-43 | P-20 | 24 | 80 | 28 |
| M-44 | P-20 | 24 | 100 | 28 |
| M-45 | P-26 | 24 | 80 | 28 |
| M-46 | P-26 | 40 | 80 | 29 |
| M-47 | P-27 | 24 | 80 | 28 |
| M-48 | P-27 | 40 | 80 | 27 |
| M-49 | P-27 | 24 | 100 | 28 |
| M-50 | P-1 | 24 | 80 | 31 |
| M-51 | P-2 | 24 | 80 | 32 |
| M-52 | P-7 | 24 | 80 | 33 |
| M-53 | P-8 | 24 | 80 | 31 |
| M-54 | P-8 | 40 | 80 | 35 |
| M-55 | P-12 | 24 | 80 | 32 |
| M-56 | P-15 | 24 | 80 | 33 |
| M-57 | P-16 | 24 | 80 | 32 |
| M-58 | P-17 | 24 | 80 | 31 |
| M-59 | P-20 | 24 | 80 | 32 |
| M-60 | P-26 | 24 | 80 | 33 |
| M-61 | P-26 | 40 | 80 | 31 |
| M-62 | P-27 | 24 | 80 | 35 |
| M-63 | P-27 | 40 | 80 | 32 |
| M-64 | P-27 | 24 | 100 | 34 |
| M-65 | P-28 | 24 | 80 | 32 |

TABLE 2

| Example | Membrane No. | Positive electrode | Negative electrode | Electrolytic solution (by volume) | Electrolyte (concentration) | Capacity drop (%) |
|---|---|---|---|---|---|---|
| 3 | M-1 | $V_6O_{13}$ | Li | PC/DME (1/1) | $LiBF_4$ (1M) | 4 |
| 4 | M-6 | " | Li—Al | " | " | 5 |
| 5 | " | $LiCoO_2$ | " | " | " | 3 |
| 6 | " | " | " | EC/DME (1/1) | " | 7 |
| 7 | M-8 | $V_6O_{13}$ | Li | PC/DME (1/1) | " | 6 |
| 8 | " | $LiCoO_2$ | Li—Al | " | " | 5 |
| 9 | M-9 | $V_6O_{13}$ | " | " | $LiCF_3SO_3$ | 9 |
| 10 | " | $LiCoO_2$ | " | PC/DME/γ-BL (2/2/1) | " | 7 |
| 11 | " | $LiMn_2O_4$ | Li | PC/DME (1/1) | $LiPF_6$ | 3 |
| 12 | M-11 | $V_6O_{13}$ | Li—Al | " | $LiBF_4$ | 4 |
| 13 | " | $Li_{0.2}Co_{0.2}V_{0.8}O_2$ | " | " | " | 5 |
| 14 | M-14 | " | " | " | " | 5 |
| 15 | M-16 | " | " | " | " | 6 |
| 16 | M-20 | $V_6O_{13}$ | Li | PC/DEC (1/1) | $LiPF_6$ | 6 |
| 17 | " | $LiCoO_2$ | Li—Al | PC/DME (1/1) | $LiBF_4$ | 4 |
| 18 | M-20 | $Li_{0.2}Co_{0.2}V_{0.8}O_2$ | Li—Al | PC/DME (1/1) | $LiBF_4$ | 9 |
| 19 | M-24 | $LiCoMnO_4$ | Li | PC/2-MeTHF (1/1) | $LiClO_4$ | 8 |
| 20 | M-26 | $LiCoO_2$ | Li—Al | PC/DME (1/1) | $LiBF_4$ | 8 |
| 21 | M-29 | " | " | " | " | 5 |
| 22 | M-31 | $Li_{0.4}Co_{0.3}V_{0.7}O_2$ | " | " | " | 3 |
| 23 | " | $LiCoO_2$ | " | " | " | 3 |
| 24 | M-33 | $Li_{0.4}Co_{0.3}V_{0.7}O_2$ | " | " | " | 4 |
| 25 | " | $LiCoO_2$ | " | " | " | 2 |
| 26 | M-38 | $V_6O_{13}$ | Li | γ-BL/DME (1/1) | $LiBF_4$ | 4 |
| 27 | " | $LiCoO_2$ | Li—Al | PC/DME (1/1) | " | 3 |
| 28 | M-43 | $V_6O_{13}$ | " | " | " | 4 |
| 29 | " | $LiMn_2O_4$ | " | PC/DEC (1/1) | $LiPF_6$ | 5 |
| 30 | M-45 | $Li_{0.4}Co_{0.3}V_{0.7}O_2$ | " | PC/DME (1/1) | $LiBF_4$ | 6 |
| 31 | " | $LiCoO_2$ | " | " | " | 5 |
| 32 | " | $V_6O_{13}$ | Li | " | " | 7 |
| 33 | M-47 | $Li_{0.4}Co_{0.3}V_{0.7}O_2$ | Li—Al | PC/DME/γ-BL (1/1/1) | $LiClO_4$ | 9 |
| 34 | " | $LiCoO_2$ | " | PC/DME (1/1) | $LiBF_4$ | 5 |
| 35 | " | $V_6O_{13}$ | " | " | " | 3 |
| 36 | M-51 | $Li_{0.2}Co_{0.2}V_{0.8}O_2$ | " | " | " | 3 |
| 37 | M-53 | $LiCoO_2$ | " | " | " | 4 |
| 38 | M-54 | $LiMn_2O_4$ | Li | EC/DME (1/1) | $LiCF_3SO_3$ | 5 |
| 39 | M-59 | $Li_{0.4}Co_{0.3}V_{0.7}O_2$ | Li—Al | PC/DME (1/1) | $LiBF_4$ | 6 |
| 40 | " | $LiCoO_2$ | " | " | " | 9 |
| 41 | M-61 | $Li_{0.4}Co_{0.3}V_{0.7}O_2$ | " | " | " | 7 |
| 42 | " | $LiCoO_2$ | " | " | " | 5 |
| 43 | M-62 | $Li_{0.4}Co_{0.3}V_{0.7}O_2$ | " | " | " | 4 |
| 44 | " | $LiCoO_2$ | " | EC/DME (1/1) | " | 5 |
| 45 | " | $V_6O_{13}$ | " | PC/DME (1/1) | " | 5 |
| 46 | M-63 | $Li_{0.2}Co_{0.2}V_{0.8}O_2$ | " | " | " | 3 |
| 47 | M-65 | $Li_{0.4}Co_{0.3}V_{0.7}O_2$ | " | " | " | 3 |
| 48 | M-65 | $LiCoO_2$ | Li—Al | PC/DME (1/1) | $LiBF_4$ | 3 |
| 49 | M-1 | " | Pitch coke calcined | EC/DEC (1/1) | $LiPF_6$ (1M) | 8 |
| 50 | M-9 | " | " | " | " | 7 |
| 51 | M-12 | " | " | " | " | 7 |
| 52 | M-20 | " | " | " | " | 6 |
| 53 | M-31 | " | " | " | " | 5 |

TABLE 2-continued

| Example | Membrane No. | Positive electrode | Negative electrode | Electrolytic solution (by volume) | Electrolyte (concentration) | Capacity drop (%) |
|---|---|---|---|---|---|---|
| 54 | M-33 | $LiMn_2O_4$ | " | EC/DME (1/1) | " | 6 |
| 55 | M-43 | $LiCoO_2$ | " | EC/DEC (1/1) | " | 8 |
| 56 | M-45 | " | " | " | " | 7 |
| 57 | M-61 | " | " | " | " | 5 |
| 58 | M-63 | " | " | " | " | 9 |
| 59 | M-64 | " | " | " | " | 5 |
| 60 | M-61 | $Li_{0.4}Co_{0.3}V_{0.7}O_2$ | " | " | " | 5 |
| 61 | M-64 | " | " | " | " | 7 |
| 62 | M-61 | $LiCoO_2$ | Polyacrylonitrile calcined | EC/DEC (1/1) | $LiPF_6$ (1M) | 8 |
| 63 | M-63 | " | " | " | " | 7 |
| 64 | M-12 | " | " | " | " | 7 |
| 65 | M-20 | " | " | " | " | 8 |
| 66 | M-61 | $Li_{0.4}Co_{0.3}V_{0.7}O_2$ | " | " | " | 7 |
| 67 | M-12 | " | " | " | " | 6 |
| 68 | M-20 | " | " | " | " | 6 |
| 69 | M-61 | " | Graphite | " | " | 8 |
| 70 | M-12 | " | " | " | " | 9 |
| 71 | M-12 | $LiCoO_2$ | $Nb_2O_5$ | PC/DME (1/1) | " | 5 |
| 72 | M-20 | " | " | " | " | 6 |
| 73 | M-61 | " | " | " | " | 7 |
| 74 | M-12 | " | $WO_2$ | EC/DME (1/1) | " | 5 |
| 75 | M-20 | " | " | " | " | 4 |
| 76 | M-61 | $LiCoO_2$ | $WO_2$ | EC/DME (1/1) | $LiBF_4$ (1M) | 7 |
| 77 | M-47 | " | " | " | " | 8 |
| 78 | M-12 | " | $\alpha$-$Fe_2O_3$ | EC/DEC (1/1) | $LiPF_6$ (1M) | 7 |
| 79 | M-20 | " | " | " | " | 5 |
| 80 | M-61 | " | " | " | " | 6 |
| 81 | M-9 | $LiMn_2O_4$ | $LiTiS_2$ | PC/DME (1/1) | $LiBF_4$ (1M) | 4 |
| 82 | M-31 | " | $Nb_2O_5$ | " | " | 4 |
| 83 | M-33 | $LiCoO_2$ | $LiTiS_2$ | " | " | 5 |
| 84 | M-20 | $Li_{0.4}Co_{0.3}V_{0.7}O_2$ | $Nb_2O_5$ | EC/DME (1/1) | " | 6 |
| 85 | M-61 | " | " | " | " | 6 |
| 86 | M-20 | " | $\alpha$-$Fe_2O_3$ | " | " | 5 |
| 87 | M-61 | " | " | " | " | 8 |
| 88 | M-12 | $LiCoO_2$ | $Nb_2O_5$ | " | " | 8 |
| 89 | M-20 | " | " | " | " | 5 |
| 90 | M-61 | " | " | " | " | 5 |
| 91 | M-12 | $LiCoO_2$ | $Nb_2O_5$ | EC/DME (1/1) | $LiBF_4$ (1M) | 7 |
| 92 | M-20 | " | " | " | " | 6 |
| 93 | M-61 | " | " | " | " | 5 |

The present invention can efficiently provide a high molecular solid electrolyte membrane having an excellent ionic conductivity on a porous membrane and a high film strength which is insusceptible to elimination and elution due to various processing steps. The use of the membrane of the present invention as a separator can provide a secondary battery which exhibits excellent charge and discharge repeating properties and is substantially insusceptible to internal shortcircuiting and dendrite formation.

While the invention has been described in detail and with reference to specific embodiments thereof, it will be apparent to one skilled in the art that various changes and modifications can be made therein without departing from the spirit and scope thereof.

What is claimed is:

1. A secondary battery comprising,
   (a) a negative electrode,
   (b) a positive electrode,
   (c) an electrolyte comprising a dissolved alkaline metal salt, and
   (d) a separator comprising a high molecular solid electrolyte membrane formed by coating a latex on both surfaces of a porous membrane, and then drying the coated latex, wherein said latex to be coated on said porous membrane is represented by the following formula (1):

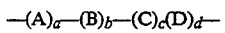

$$-(A)_a-(B)_b-(C)_c-(D)_d- \tag{1}$$

wherein A represents a repeating unit obtained by polymerizing a monomer having one polymerizable ethylenically unsaturated group and having nonpolar groups connected to side chain ester groups and amide groups or a monomer having one polymerizable ethylenically unsaturated group and having a nonpolar group in side chains; B represents a repeating unit obtained by polymerizing a monomer having one polymerizable ethylenically unsaturated group and having polar groups connected to side chain ester groups and amide groups or a monomer having one polymerizable ethylenically unsaturated group and having a cyano group; C represents a repeating unit obtained by polymerizing a monomer having at least two polymerizable ethylenically unsaturated groups, at least one of which being in side chains; D represents a repeating unit obtained by polymerizing a monomer having one polymerizable ethylenically unsaturated group and having crosslinkable groups in side chains; and a, b, c and d represent a percentage molar fraction of 0 to 95, 5 to 95, 1 to 20, and 1 to 80, respectively.

2. The secondary battery according to claim 1, wherein B represents acrylonitrile, methacrylonitrile, or a compound according to the following formula (3):

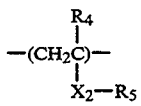

(3)

wherein $R_4$ represents a hydrogen atom or a methyl group; $X_2$ represents a divalent connecting group; $R_5$ is $-(CH(R_6)CH(R_7)O)_m-R_6$ or $-X_3-R_9$; $R_6$, $R_7$ and $R_8$ each is a hydrogen atom or a $C_{1-5}$ alkyl group; m is an integer of 1 to 50; $X_3$ is a $C_{1-10}$ alkylene group; $R_9$ represents a polar group other than a chain ether.

3. The secondary battery according to claim 2, wherein B represents a compound according to formula (3) in which $R_9$ represents a cyclic ether group or a carbonic ester group.

4. The secondary battery according to claim 2, wherein B represents a compound according to formula (3) in which $R_9$ represents a 3- to 12-membered cyclic ether group, a 5- to 7-membered cyclic carbonic ester group, or a $C_{2-7}$ (including carbon atoms contained in the carbonyl group) noncyclic carbonic ester group.

5. The secondary battery according to claim 2, wherein $R_9$ represents a 3- to 8-membered cyclic ether group, a 5- or 6-membered cyclic carbonic ester group, or a $C_{2-5}$ (including carbon atoms contained in the carbonyl group) noncyclic carbonic ester group.

6. The secondary battery according to claim 2, wherein B represents acrylonitrile.

7. The secondary battery according to claim 2, wherein B represents methacrylonitrile.

8. The secondary battery according to claim 1, wherein the drying time is from 1 to 240 hours.

9. The secondary battery according to claim 8, wherein the drying time is from 1 to 100 hours.

10. The secondary battery according to claim 9, wherein the drying time is from 5 to 50 hours.

11. The secondary battery according to claim 1, wherein an elastomeric high molecular compound is added to said latex to be coated on said porous membrane.

12. The secondary battery according to claim 1, wherein said negative electrode comprises an active material selected from the group consisting of alkaline metal, alkaline metal alloy, carbon material and transition metal chalchogenide.

13. The secondary battery according to claim 1, wherein the latex is coated at a thickness on one side of from 1 to 50 μm.

14. The secondary battery according to claim 1, wherein the latex is coated at a thickness on one side of from 1 to 25 μm.

15. The secondary battery according to claim 1, wherein A represents a compound according to the following formula (2):

(2)

wherein $R_1$ represents a hydrogen atom or a methyl group; $X_1$ represents a divalent connecting group; $R_2$ represents a hydrogen atom, an alkyl group, an alkenyl group, an alkynyl group, an aralalkyl group, or an aryl group.

16. The secondary battery according to claim 1, wherein C represents a compound according to the following formula (4):

$$CH_2=C(R_{10})C(O)-X_4-(O)C(R_{11})C=CH_2 \qquad (4)$$

wherein $R_{10}$ and $R_{11}$ each represents a hydrogen atom or a methyl group; $X_4$ represents $-NH-X_5-NH-$ or $-O-X_5-O-$; $X_5$ represents an alkylene group or $-(CH(R_{12})CH(R_{13})O)_n-$; $R_{12}$ and $R_{13}$ each is a hydrogen atom or a $C_{1-5}$ alkyl group; and n is an integer of 1 to 20.

17. The secondary battery according to claim 1, wherein C represents a compound according to the following formula (5):

$$CH_2=C(R_{14})C(O)-O-CH_2)_3C-R_{15} \qquad (5)$$

wherein $R_{14}$ each represents a hydrogen atom or a methyl group and $R_{15}$ represents a $C_{1-10}$ alkyl group.

18. The secondary battery according to claim 1, wherein D represents a compound containing an epoxide group, an amino group, a carboxyl group, an acid anhydride group, a hydroxyl group, an amide group, an N-methylolamide group, or an ether of N-methylolamide or isocyanate.

* * * * *